(12) United States Patent
Bosco, Jr.

(10) Patent No.: US 7,726,450 B2
(45) Date of Patent: Jun. 1, 2010

(54) SHIM AND A SUBASSEMBLY INCLUDING A SHIM AND BACKING PLATE

(75) Inventor: Robert Bosco, Jr., Wolcott, CT (US)

(73) Assignee: Anstro Manufacturing, Inc., Wolcott, CT (US)

( * ) Notice: Subject to any disclaimer, the term of this patent is extended or adjusted under 35 U.S.C. 154(b) by 588 days.

(21) Appl. No.: 11/706,511

(22) Filed: Feb. 12, 2007

(65) Prior Publication Data

US 2008/0190716 A1    Aug. 14, 2008

(51) Int. Cl.
*F16D 65/04* (2006.01)

(52) U.S. Cl. .............................. 188/250 G; 188/250 F; 188/73.37

(58) Field of Classification Search ............. 188/250 B, 188/250 F, 250 G
See application file for complete search history.

(56) References Cited

U.S. PATENT DOCUMENTS

| | | | |
|---|---|---|---|
| 4,722,424 A | 2/1988 | Ikeuchi | |
| 5,509,508 A | 4/1996 | Evans | |
| 5,816,370 A | 10/1998 | Verbeeten et al. | |
| 6,105,736 A | 8/2000 | Akita et al. | |
| 6,257,379 B1 | 7/2001 | Matsumoto et al. | |
| 6,349,803 B2 | 2/2002 | Brosilow | |
| 6,578,680 B1 | 6/2003 | Bosco et al. | |
| 6,913,120 B2 | 7/2005 | Bosco et al. | |
| 2005/0194223 A1* | 9/2005 | Murayama | 188/73.38 |
| 2006/0027427 A1* | 2/2006 | Anda et al. | 188/73.1 |
| 2006/0157307 A1 | 7/2006 | Tsurumi et al. | |

* cited by examiner

*Primary Examiner*—Bradley T King
*Assistant Examiner*—Anna Momper
(74) *Attorney, Agent, or Firm*—Carmody & Torrance LLP

(57) ABSTRACT

A shim for use in a braking subassembly comprising a metal backing plate comprising a first side surface, wherein the shim comprises at least one flexible tab extending from an edge thereof for assisting in coupling the shim to the backing plate along a backing plate side surface thereof, and wherein the at least one flexible tab comprises an integrally formed and extending finger therefrom, wherein the finger has a leading edge that frictionally engages the backing plate edge surface when the shim is subjected to a separation force, which, relative to the backing plate, has a directional component at least essentially parallel to and in the same direction as the direction in which the finger extends; whereby the shim is resisted from separating from the first side surface of the backing plate at least in part by the frictional resistance of the leading edge of the finger against the backing plate side surface.

4 Claims, 5 Drawing Sheets

SHIM AND A SUBASSEMBLY INCLUDING A SHIM AND BACKING PLATE

BACKGROUND OF THE INVENTION

The present invention relates generally to shim constructions, and in particular, to an improved shim construction for ensuring improved mechanical attachment of the shim to the backing plate, and an improved assembly formed thereby.

Attachment arrangements for securing a shim to a backing plate are known, examples of which include the use of pins (e.g. U.S. Pat. No. 6,349,803), staples (e.g. U.S. Pat. No. 6,578,680) and integrally formed posts formed from the backing plate itself (e.g. U.S. Pat. No. 6,913,120). Tabs that engage the edge of the backing plate are also known (e.g. U.S. Pat. No. 5,816,370).

However, in certain subassembly configurations, it has been discovered that still further developments in the art are desirable. For example, the present inventors have found that the mere use of only tabs for securing the shim to the backing plate may not provide the desired resistance should there be a sufficiently applied force trying to separate the shim from the backing plate. Clearly, pins, staples and other securing means could be employed to assist in the foregoing regard as is well known in the art.

Nevertheless, it would be advantageous to improve the coupling of the shim against the backing plate using tabs should the foregoing means (e.g. pins, staples, etc.) not be desired. Alternatively, such additional means could be used in combination with the improved tab construction disclosed herein. Therefore, employing the features of the present invention is not intended to imply that additional securing means cannot or need not be used. Rather, the present invention is merely directed to yet an additional feature available for incorporation into a shim construction using one or more tabs.

Through testing and analysis, it has been determined that improved shim attachments are therefore achievable and provided by the present invention.

It has thus been recognized that improvements to the state of the art are achievable and believe that the present invention overcomes perceived deficiencies in the prior art as well as provides the objectives and advantages set forth above and below.

SUMMARY AND OBJECTIVES OF THE INVENTION

Therefore, it is an object and advantage of the present invention to provide an improved shim construction.

It is a further object and advantage of the present invention to provide an improved shim construction that increases the resistance between the shim and the backing plate thereby reducing the likelihood of undesirable or untimely separation therebetween.

It is thus another specific object of the present invention to provide an improved shim (and resulting assembly) that improves the coupling between the shim and the backing plate and decreases the likelihood of decoupling of the shim from the backing plate when the use of tabs is desired.

Further objects and advantages of the invention will become more apparent from a consideration of the drawings and ensuing description.

The invention accordingly comprises the features of construction, combination of elements, arrangement of parts and sequence of steps that will be exemplified in the disclosure hereinafter set forth, and the scope of the invention will be indicated in the claims.

To overcome the perceived deficiencies in the prior art and to achieve the objects and advantages above and below, the present invention is, generally speaking, directed to a shim, and a subassembly comprising a backing plate and a shim.

In a first embodiment, the present invention is directed to the subassembly for use in a brake assembly, wherein the subassembly comprises a metal backing plate comprising a first side surface; and a shim comprising at least one flexible tab extending from an edge thereof for assisting in coupling the shim to the backing plate along a backing plate side surface thereof, and wherein the at least one flexible tab comprises an integrally formed and extending finger therefrom, wherein the finger has a leading edge that frictionally engages the backing plate edge surface when the shim is subjected to a separation force, which, relative to the backing plate, has a directional component at least essentially parallel to and in the same direction as the direction in which the finger extends; whereby the shim is resisted from separating from the first side surface of the backing plate at least in part by the frictional resistance of the leading edge of the finger against the backing plate side surface.

In another preferred embodiment, the present invention is directed to the shim, which preferably comprises at least one flexible tab extending from an edge thereof for assisting in coupling the shim to the backing plate along a backing plate side surface thereof, and wherein the at least one flexible tab comprises an integrally formed and extending finger therefrom, wherein the finger has a leading edge that frictionally engages the backing plate edge surface when the shim is subjected to a separation force, which, relative to the backing plate, has a directional component at least essentially parallel to and in the same direction as the direction in which the finger extends; whereby the shim is resisted from separating from the first side surface of the backing plate at least in part by the frictional resistance of the leading edge of the finger against the backing plate side surface.

A method of forming the braking subassembly and a shim therefor is also provided.

BRIEF DESCRIPTION OF THE DRAWINGS

The above set forth and other features of the invention are made more apparent in the ensuing Description of the Preferred Embodiments when read in conjunction with the attached Drawings, wherein.

Like numbers to identify like parts and features will be used among the various figures, but not all features will be specifically identified in each illustration.

DETAILED DESCRIPTION OF THE PREFERRED EMBODIMENTS

Figure 1A:
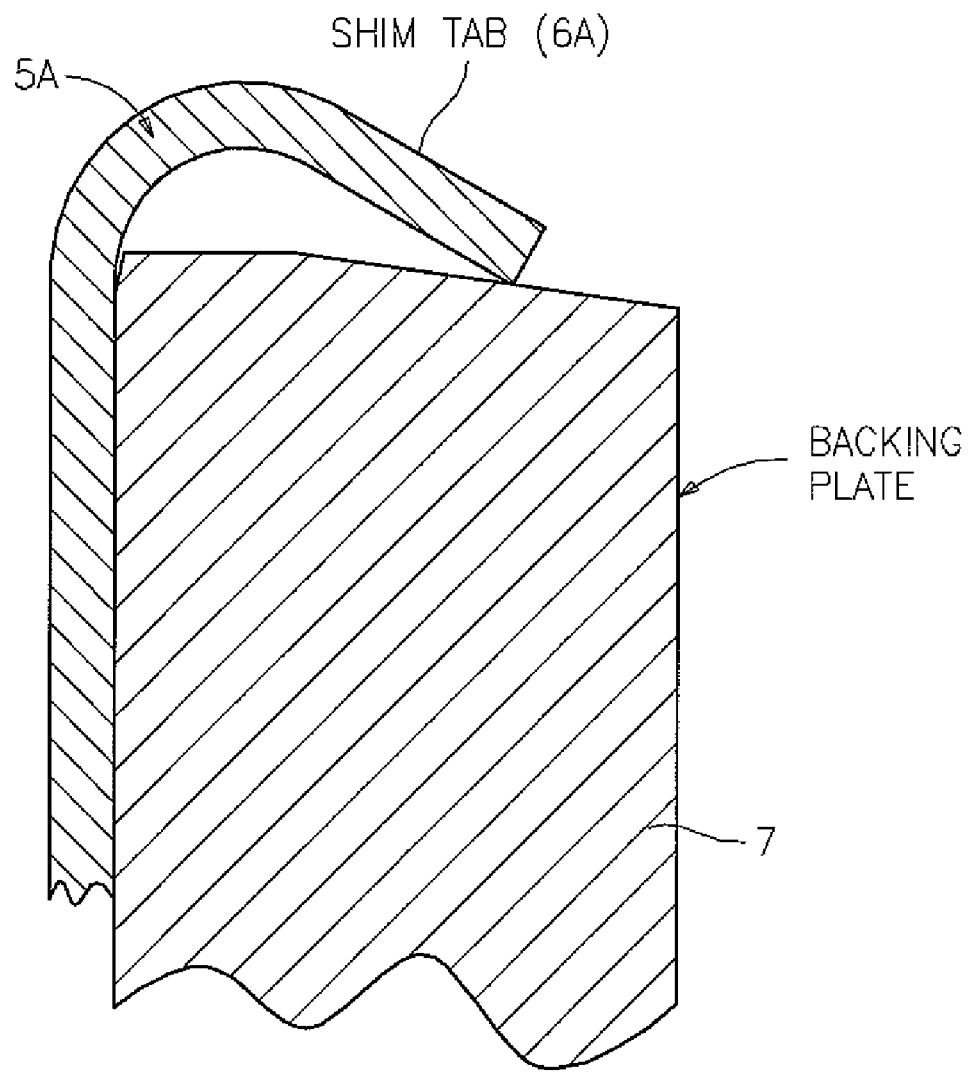
FIG. 1A is a simplified cross-sectional view of a conventional subassembly comprising a backing plate and shim, illustrating the use and position of a conventional tab when the shim is positioned against and coupled to the backing plate.
Figure 1B:
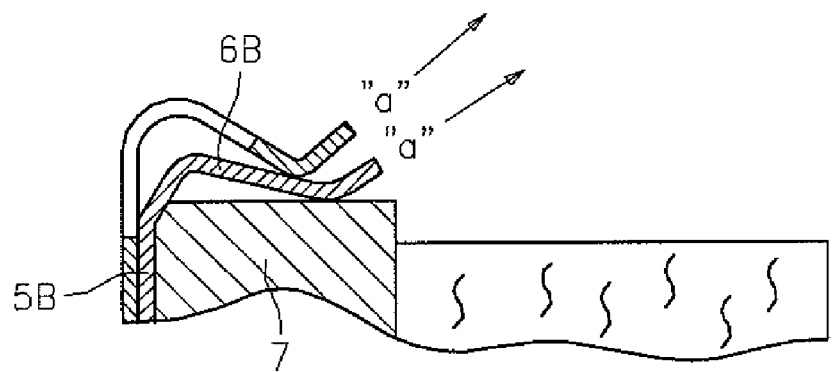
FIG. 1B is a simplified cross-sectional view of a conventional subassembly comprising among other features, a backing plate and shim, all of which is illustrated in U.S. Published Application No. 2006/0157307.
Figure 1C:
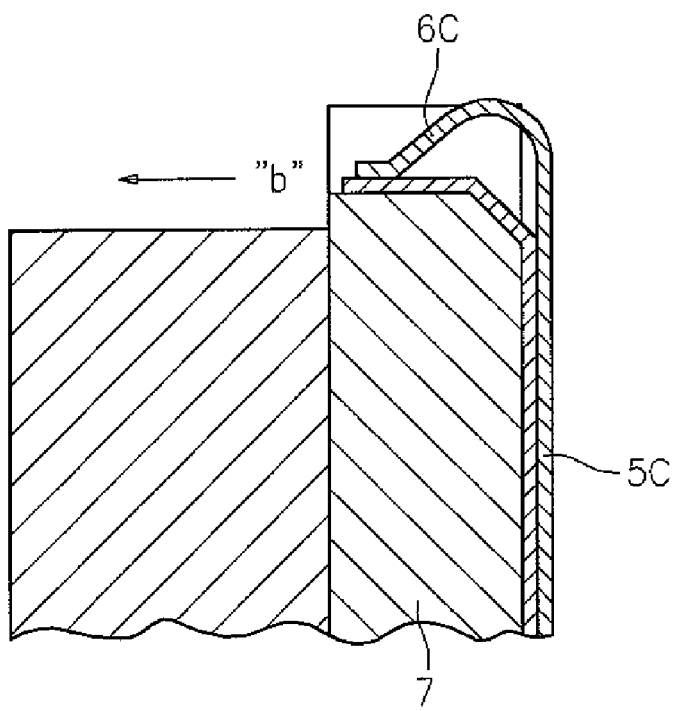
FIG. 1C is a simplified cross-sectional view of a conventional subassembly comprising among other features, a backing plate and shim, all of which is illustrated in U.S. Published Application No. 2006/0027427.

Reference is first made to FIGS. 1A, 1B and 1C for illustrations of conventional shims with various forms of conventional tab constructions. Specifically the shims of FIGS. 1A, 1B and 1C, generally indicated by reference numeral 5A, 5B and 5C respectively, comprise one or more respective tabs 6A, 6B, 6C that may be bent over the edge of a conventional backing plate 7 to assist in coupling the shim thereto. The constructions set forth in FIGS. 1B and 1C may be found in respective U.S. Published Application Nos. 2006/0157307 and 2006/0027427.

The present invention improves upon the foregoing use of a conventional tab. Specifically, the present invention improves upon the foregoing by providing a shim comprising at least one flexible tab extending from an edge thereof for assisting in coupling the shim to the backing plate along a backing plate side surface thereof, and wherein the at least one flexible tab comprises an integrally formed and extending finger therefrom, wherein the finger has a leading edge that frictionally engages the backing plate side surface when the shim is subjected to a separation force, which, relative to the backing plate, has a directional component at least essentially parallel to and in the same direction as the direction in which the finger extends; whereby the shim is resisted from separating from the first side surface of the backing plate at least in part by the frictional resistance of the leading edge of the finger against the backing plate side surface. In a preferred embodiment, the finger may be machine punched, using well known techniques, from the tab.

Figure 4:
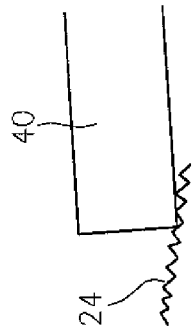
FIG. 4 is an enlarged view of the circled region of FIG. 3.
Figure 3:
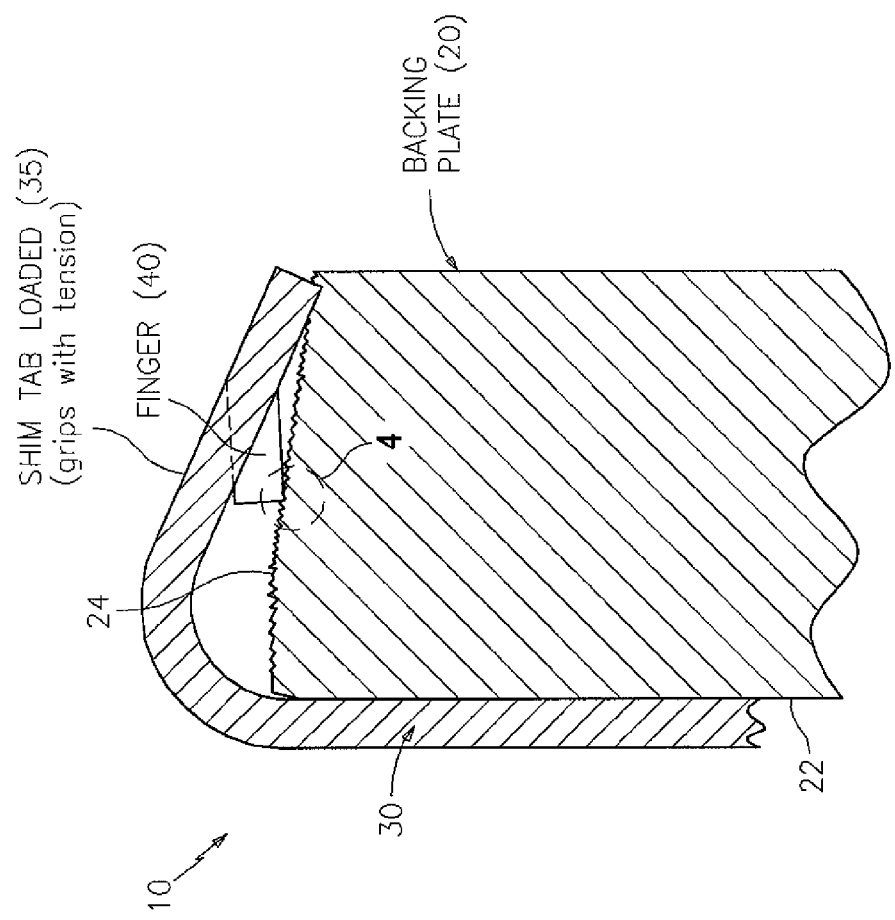
FIG. 3 is a simplified cross-sectional view of a subassembly constructed in accordance with the present invention, comprising a conventional backing plate and the shim of FIG. 2.
Figure 6:
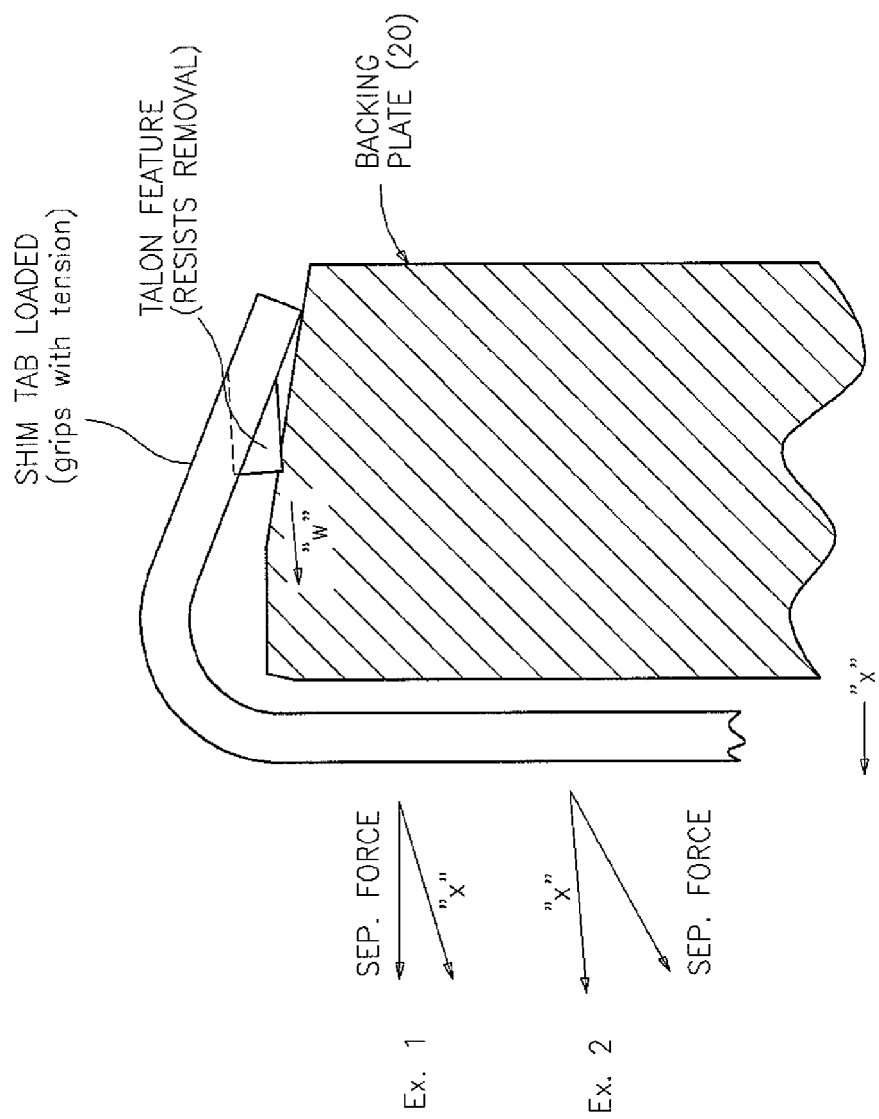
FIG. 6 is a simplified cross-sectional view of the subassembly illustrated in FIG. 3, illustrating a separation of the shim from backing plate and further illustrating the leading edge of the shim frictionally engaging the backing plate side surface when the shim is subjected to a separation force having a directional component at least essentially parallel to and in the same direction as the direction in which the finger extends.

A shim and subassembly formed thereby is illustrated, for example, in FIGS. 3, 4 and 6.

Specifically, in a preferred embodiment, a subassembly, constructed in accordance with the present invention and generally indicated at 10, comprises a metal backing plate 20 having a first side surface 22; and a shim, generally indicated at 30, comprising at least one flexible tab 35 extending from an edge thereof for assisting in coupling shim 30 to backing plate 20 along a backing plate side surface 24 thereof. In accordance with the present invention, the at least one flexible tab 35 comprises an integrally formed and extending finger 40, wherein the finger has a leading edge 45 (see e.g. FIG. 5) that frictionally engages the backing plate side surface 24 when shim 30 is subjected to a separation force, which, relative to the backing plate, has a directional component at least essentially parallel to and in the same direction as the direction in which the finger extends. In other words, the force is such and in a direction whereby the shim is urged to separate (i.e. in the direction of arrow "x") from the backing plate.

In view of the possible interpretations of the foregoing terms, the following is set forth to ensure clarity of the invention being disclosed and claimed.

Figure 5:
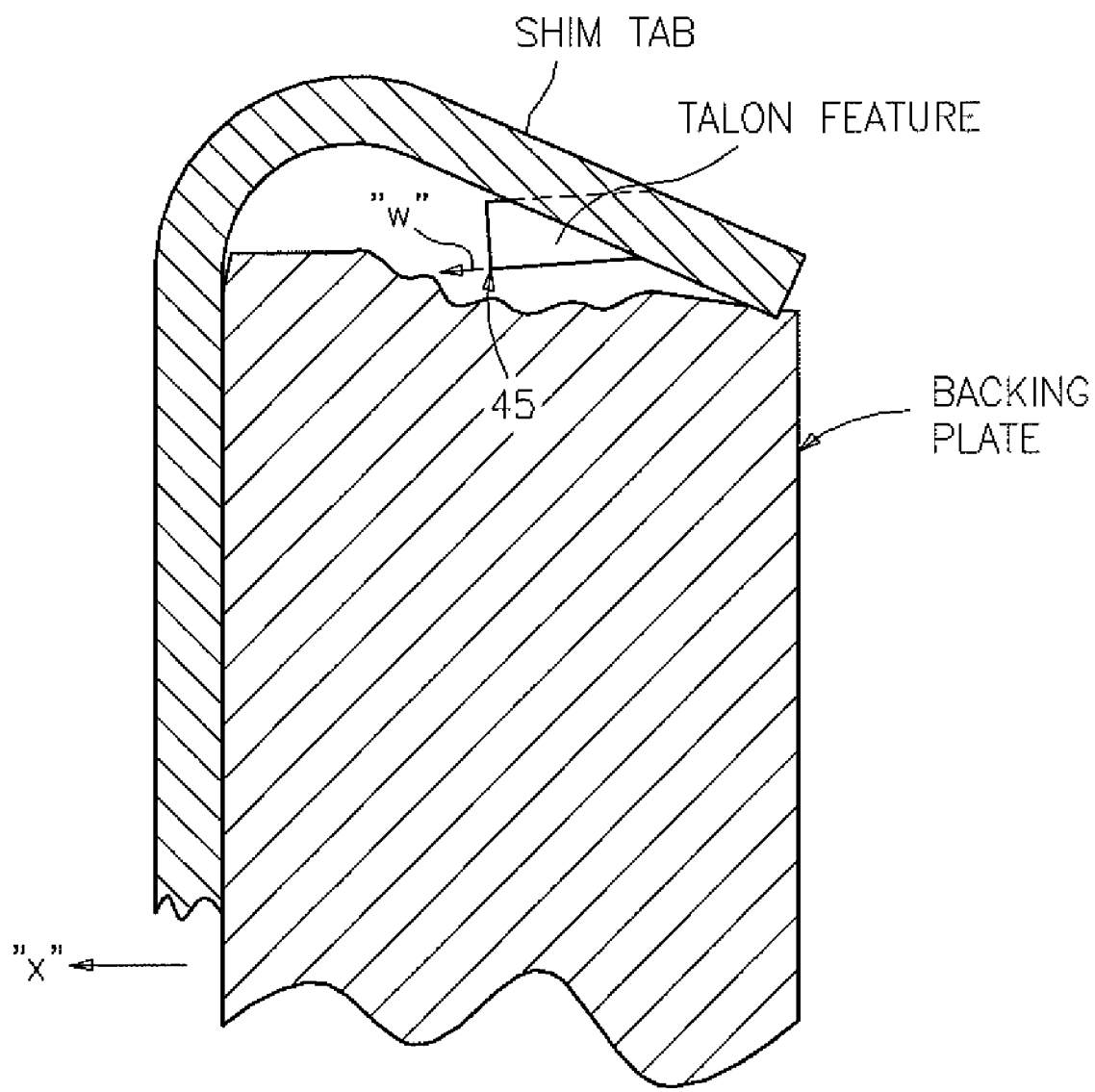
FIG. 5 is a view of FIG. 3 with part of the backing plate removed for simplicity so additional features of the present invention can be highlighted.

"Separation force" is intended to mean a force that attempts to move the shim and backing plate away from one another, such as that indicated by arrow "x" (e.g. FIG. 6). "Relative to the backing plate" is provided as an intent to recognize that one could view the separation force as being in a direction opposite arrow "x", but, using the "relative" qualifier, it is intended to define a direction that is at least roughly the same as the direction that finger 40 is extending (e.g. "pointing") (e.g. in the direction of arrow "w" (FIG. 5)) and to patentably distinguish the position and direction of finger 40 from for example, the tab constructions of FIGS. 1B and 1C. A "separation force having a directional component" is intended to mean a horizontal and/or vertical component (e.g. vectors) associated with the "separation force." As shown in the illustrations, it is intended to mean that the direction of finger 40, for example in FIG. 5, is in the direction of arrow "w." Thus, a separation force having a directional component at least essentially parallel to and in the same direction as finger 40 would be a separation force (or component thereof) in the direction of arrow "x." Such a separation force is shown by arrow "x." Several examples are illustrated in FIG. 6.

As indicated above, the foregoing is provided as a way to express the differences and patentability distinguish any "finger" that may be interpreted to exist in the prior art. For example, using the foregoing nomenclature, the direction of the finger of any interpreted finger in FIG. 1B would be in the direction of arrow "a" and the direction of the leading edge of any interpreted finger in FIG. 1C would be in the direction of arrow "b." Thus, the present invention makes clear that the shim of the present invention, namely shim 30, is resisted from separating from first side surface 22 of backing plate 20 at least in part by the frictional resistance of leading edge 45 of finger 40 against backing plate side surface 24. As would be clear in accordance with the foregoing, the separation force if applied in an essentially parallel and same direction as any finger found to exist in the prior art (e.g. FIG. 1B or 1C), would not be seen to separate the shim from the backing plate, but rather to more securely couple them together. In other words, the finger of the present invention operates in a manner similar to a claw or fish hook, features of which are clearly absent and patentably distinct from the shim constructions found in the prior art.

Figure 2:
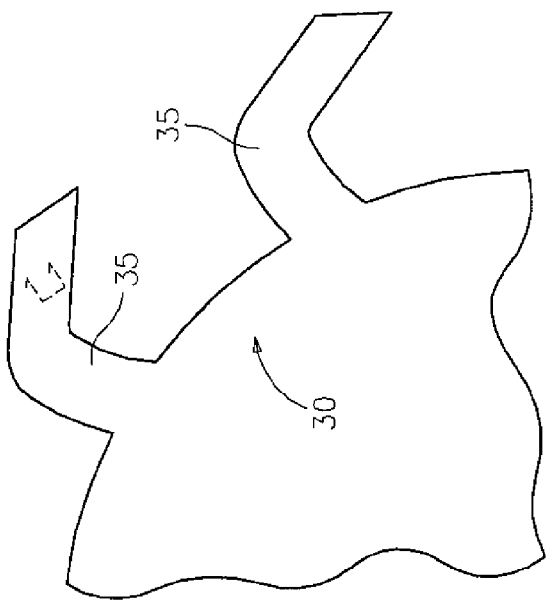
FIG. 2 is a simplified perspective view of a shim constructed in accordance with the present invention, wherein the shim comprises at least one flexible tab itself having an integrally formed and extending finger that is frictionally engagable with the backing plate to assist in resisting the separation of the shim from the backing plate.

Preferably, finger 40 may be machine punched in tab 35. Moreover as illustrated in FIG. 2 more than one tab may be provided and more than one tab may be provided with the finger feature disclosed above.

The present invention significantly reduces the likelihood that shim 30 will become sheared or detached from backing plate 20 during for example, a braking operation.

The construction of shim 30 with the finger feature of the present invention is also advantageous in view of its use in the after market. Specifically, in view of basic "wear and tear" for example of the backing plate, it is likely that in the after market, side surface 24 does not stay pristine, which it may otherwise be at the manufacturer's factory and prior to installation. Therefore, it is more likely that the side surface 24 has irregularities in it, as exemplified in FIG. 4 (e.g. it is not perfectly flat or smooth). In such a situation, the use of a finger, such as finger 40, that "angles back" as shown in the figures and is similar to a claw, is extremely advantageous for providing increased frictional engagement with side surface 24 of backing plate 30 when shim 30 is urged away from the backing plate, such as in the direction of arrow "x" relative to plate 20. There is believed not to be any awareness of any such similar appreciation or construction in the art.

To be clear, the present invention is not intended to replace or necessarily be used instead of other types of securing means, such as staples, pins, posts, etc., but rather can be used in combination therewith or in situations where one or more of the other securing methods is either not available or not easily usable with the particular shim or backing plate design. Therefore, nothing herein is intended to mean that the use of the present invention is to be at the exclusion of other securing methods, but rather is merely a construction to provide those in the field with additional options. For example, the present invention may also take advantage of the functional features found in the DRIFTLOK™ shim.

Preferably, the shim of the present invention is of a multi-layered construction, comprising layers of aluminum, metal alloys, laminates and/or layers of metals and adhesive and other materials, such as plastic if desirable, with the adhesive being of acrylic, thermal setting adhesive, or a combination of both. However, other constructions are well within the scope of the present invention and covered thereby.

While the invention has been particularly shown and described with respect to preferred embodiments thereof, it will be understood by those skilled in the art that changes in form and details may be made therein without departing from the scope and spirit of the invention. For example, a plurality of tabs 35 arranged about the edges of shim 30 may be used, with one or more of such tabs including a finger as set forth herein. For example, it has been found advantageous to have at least three (3) tabs with at least two (2) of such tabs including a finger 40.

It can now be seen that a shim and subassembly constructed in accordance with the present invention improves and/or furthers the state of the art with respect to the mechanical coupling arrangements between a shim and a backing plate in a brake assembly, such as a disc-brake assembly. In particular, the present invention provides an improved shim and methodology (and resulting assembly) of coupling a shim to a backing plate in a brake assembly that provides superior noise-reduction and a decrease in the likelihood of decoupling of the shim from the backing plate, which may result from, for example, the frictional engagement of the brake pads and the disc. Furthermore, the present invention provides for alternative embodiments so as to be useable with a variety of shim constructions, such as those mentioned above.

What is claimed is:

1. A subassembly for use in a brake assembly, the subassembly comprising:
   a metal backing plate comprising a backing plate side surface; and
   a shim comprising at least one flexible tab extending from an edge thereof for assisting in coupling the shim to the backing plate along the backing plate side surface, and wherein the at least one flexible tab comprises an integrally formed and extending finger from an at least substantially central region of the tab, wherein when the shim is coupled to the backing plate, the flexible tab extends in a direction away from the backing plate side surface and the extending finger is arranged to extend in a direction toward the backing plate side surface, and wherein the finger has a leading edge that frictionally engages a backing plate edge surface such that when the shim is subjected to a separation force that acts to separate the coupling of the shim to the backing plate, the leading edge of the finger is subject to a force relative to the backing plate that has a directional component at least essentially parallel to and in the same direction as the direction in which the finger extends from the flexible tab;
   whereby the shim is resisted from separating from the backing plate side surface at least in part by the frictional resistance of the leading edge of the finger against the backing plate edge surface.

2. The subassembly as claimed in claim 1, wherein the finger is formed by machine punching the tab.

3. A shim for use in a braking subassembly comprising a metal backing plate comprising a backing plate side surface, wherein the shim comprises:
   at least one flexible tab extending from an edge thereof for assisting in coupling the shim to the backing plate along the backing plate side surface, and wherein the at least one flexible tab comprises an integrally formed and extending finger from an at least substantially central region of the tab, wherein when the shim is coupled to the backing plate, the flexible tab extends in a direction away from the backing plate side surface and the extending finger is arranged to extend in a direction toward the backing plate side surface, and wherein the finger has a leading edge that frictionally engages a backing plate edge surface such that when the shim is subjected to a separation force that acts to separate the coupling of the shim to the backing plate, the leading edge of the finger is subject to a force relative to the backing plate that has a directional component at least essentially parallel to and in the same direction as the direction in which the finger extends from the flexible tab;
   whereby the shim is resisted from separating from the backing plate side surface at least in part by the frictional resistance of the leading edge of the finger against the backing plate edge surface.

4. The shim as claimed in claim 3, wherein the finger is formed by machine punching the tab.

* * * * *